United States Patent [19]

Hosono et al.

[11] Patent Number: 5,075,133

[45] Date of Patent: Dec. 24, 1991

[54] PROCESS FOR PREPARATION OF ANTI-FOGGING COATING

[75] Inventors: Hiroshi Hosono, Otsu; Takashi Taniguchi, Shiga; Michiaki Nishii, Ohmihachiman, all of Japan

[73] Assignee: Toray Industries, Inc., Japan

[21] Appl. No.: 558,605

[22] Filed: Jul. 27, 1990

[30] Foreign Application Priority Data

| Jul. 27, 1989 | [JP] | Japan | 1-196294 |
| Dec. 8, 1989 | [JP] | Japan | 1-319466 |
| Dec. 8, 1989 | [JP] | Japan | 1-319467 |
| Dec. 8, 1989 | [JP] | Japan | 1-319468 |
| Dec. 8, 1989 | [JP] | Japan | 1-319469 |

[51] Int. Cl.$^5$ .............................................. B05D 5/06
[52] U.S. Cl. .................................. 427/162; 427/163; 427/164; 427/165; 427/341
[58] Field of Search .............. 427/164, 162, 163, 341, 427/165

[56] References Cited

U.S. PATENT DOCUMENTS

| 3,479,308 | 11/1969 | Gattenby, Jr. et al. | 260/23 |
| 3,700,487 | 10/1972 | Crandon et al. | 427/164 |
| 3,737,335 | 6/1973 | Feinberg | 427/165 |
| 3,773,776 | 11/1973 | Iler | 260/29.6 B |
| 3,865,619 | 2/1975 | Pennewiss et al. | 427/164 |
| 4,016,129 | 4/1977 | Miyosawa | 260/29.6 B |
| 4,127,682 | 11/1978 | Laurin | 427/164 |

Primary Examiner—Janyce Bell
Attorney, Agent, or Firm—Austin R. Miller

[57] ABSTRACT

An anti-fogging coating having a good and durable anti-fogging property is prepared by coating a composition comprised of as main components, (A) a polyvinyl alcohol, (B) a crosslinking agent, (C) water and (D) a nitrogen-containing organic solvent on a substrate, and heat-curing the coated composition.

12 Claims, No Drawings 5,075,133

PROCESS FOR PREPARATION OF ANTI-FOGGING COATING

BACKGROUND OF THE INVENTION

(1) Field of the Invention

The present invention relates to a process for the preparation of an anti-fogging coating capable of imparting a highly durable anti-fogging property.

The present invention is especially suitable for the preparation of an anti-fogging coating on inorganic glass and plastic materials.

(2) Description of the Related Art

Plastic materials and inorganic glass materials are widely used for articles such as window-panes, mirrors, spectacle lenses and goggles, in view of their good properties as a transparent substrate. Nevertheless, when articles comprising these transparent substrates are used in high-temperature and high-humidity conditions or at a boundary surface where the difference of the temperature or humidity is large, dewing occurs on the surfaces of the articles and the surfaces of the articles become foggy. Especially in the case of transparent substrates such as windowpanes, spectacle lenses and mirrors, a serious problem exists in that the article surface becomes foggy or is easily damaged. Accordingly, means for eliminating such disadvantage are urgently required in various fields, and attempts have been made to impart an anti-fogging property and a durability to various articles represented by transparent substrates.

As the simplest method for manifesting an anti-fogging effect, a method has been proposed wherein the wettability of the surface of an article is improved by coating or incorporating a hydrophilic substance such as a surface active agent (see, for example, U.S. Pat. No. 3,479,308). According to this method, however, only temporary anti-fogging property is given to an article and a durable effect cannot be obtained.

Coating of polyvinyl alcohol or other hydrophilic polymers for imparting a durable anti-fogging property has been proposed. For example, U.S. Pat. No. 4,127,682 proposes an anti-fogging agent comprising a polyvinyl alcohol crosslinked with zirconium nitrate and formaldehyde.

Furthermore, it is known that a polyvinyl alcohol is crosslinked with finely divided silica to give a water-resistant coating (see U.S. Pat. No. 3,773,776).

Moreover, a curable coating composition comprising a polyvinyl alcohol/silica complex as the main component is proposed (see U.S. Pat. No. 4,016,129).

Nevertheless, according to these proposals, the hydrophilic characteristics of the polyvinyl alcohol are drastically reduced. Namely, the anti-fogging property of the polyvinyl alcohol becomes very poor, and satisfactory anti-fogging coating materials cannot be provided.

Still further, a technique of forming a two-layer coating composed of a polyvinyl alcohol, finely divided silica and an organic silicon compound has been proposed (see U.S. Pat. No. 4,478,909), but this technique does not give a sufficient anti-fogging property.

SUMMARY OF THE INVENTION

It is a primary object of the present invention to solve the above-mentioned problems of the conventional technique and provide a process for the preparation of an anti-fogging coating having a good and durable anti-fogging property.

In accordance with the present invention, there is provided a process for the preparation of an anti-fogging coating, which comprises coating a substrate with a composition comprising, as main components, (A) a polyvinyl alcohol, (B) a crosslinking agent, (C) water and (D) a nitrogen-containing organic solvent, and heat-curing the composition.

DESCRIPTION OF THE PREFERRED EMBODIMENTS

The polyvinyl alcohol used as the component (A) in the present invention is obtained by partial or complete hydrolysis of polyvinyl acetate. A polyvinyl alcohol having an average polymerization degree of 250 to 3,000 and containing a hydroxyl group in an amount such as corresponding to a saponification degree of at least 70 mole % is preferably used in the present invention. If the average degree of polymerization is lower than 250, the durability and water resistance are lowered, and if the average degree of polymerization is higher than 3,000, the coating composition having the polyvinyl alcohol incorporated therein exhibits an undesirably increased viscosity during coating, and a smooth coating is difficult to obtain. If the saponification degree is lower than 70 mole %, it is occasionally difficult to form a coating having a good anti-fogging property.

Many known crosslinking agents can be used as the crosslinking agent (B) for imparting a three-dimensional structure to the polyvinyl alcohol, as long as they are capable of insolubilizing the polyvinyl alcohol. As specific examples of the crosslinking agent, there can be mentioned epoxy resins, melamine resins, silane coupling agents, metal compounds, urea resins, and finely divided silica.

In view of the transparency, the ease of cross-linking, and the improvement of the hardness and the water resistance, silane coupling agents are preferable among these crosslinking agents. Compounds represented by the following general formulae (I) and (II) and hydrolysis products thereof are especially preferable:

and

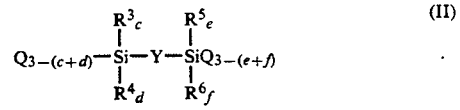

wherein $R^1$, $R^3$ and $R^5$ represent an organic group having 4 to 14 carbon atoms, which contains an epoxy group, $R^2$, $R^4$ and $R^6$ represent a hydrocarbon group having 1 to 14 carbon atoms, or a hydrocarbon group having 1 to 14 carbon atoms which has a substituent selected from the group consisting of a halogeno group, a mercapto group, a cyano group, a methacryloxy group, an acryloxy group and an amino group, X and Q represent a hydrolyzable group, each of a, c and e is 0 or 1 and each of b, d and f is 0, 1 or 2, with the proviso that each of (a+b), (c+d) and (e+f) is 0, 1 or 2, and Y represents an organic group having 2 to 40 carbon atoms.

In the formula (I), as the epoxy group included in $R^1$, there can be mentioned aliphatic epoxy groups such as a glycidoxy group, and alicyclic epoxy groups such as a 3,4-epoxycyclohexyl group. $R^1$ represents an organic group having 4 to 14 carbon atoms, including that of the epoxy group, and is contained as a monovalent organic group bonded to the Si atom in the silane compound. $R^2$ represents a hydrocarbon group having 1 to 14 carbon atoms, such as a methyl group, an ethyl group, a vinyl group, a propyl group, an octyl group or a phenyl group, or a substituted derivative of this hydrocarbon group. As the substituent, there can be mentioned a halogeno group such as a chloro or fluoro group, a mercapto group, a cyano group, a methacryloxy group, an acryloxy group or an amino group. $R^2$ is a monovalent organic group as well as $R^1$ and is contained through the Si-C bond in the silane compound. X is a hydrolyzable group, and there can be mentioned an alkoxy group such as a methoxy group, an ethoxy group or a butoxy group, a carboxy group such as an acetoxy group, a halogeno group such as a chloro group or a bromo group, an alkoxyalkoxy group such as a methoxyethoxy group or an ethoxyethoxy group, a ketoxime group and a propenyl group. Furthermore, in the formula (I), a is 0 or 1 and b is 0, 1 or 2, with the proviso that (a+b) is 0, 1 or 2. When b is 2, groups $R^2$ may be the same or different.

As typical instances of the organic silicon compound represented by the formula (I), there can be mentioned trialkoxysilanes, triacyloxysilanes, triphenoxysilanes and hydrolysis products thereof, such as methyltrimethoxysilane, methyltriethoxysilane, methyltrimethoxyethoxysilane, methyltriacetoxysilane, methyltripropoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trichloropropyltrimethoxysilane, γ-methacryloxypropyltrimethoxysilane, γ-aminopropyltrimethoxysilane, γ-aminopropyltriethoxysilane, γ-mercaptopropyltrimethoxysilane, γ-mercaptopropyltrimethoxyethoxysilane, γ-mercaptopropyltrimethoxyethoxysilane, N-β-(aminoethyl)-γ-amimethoxysilane, β-cyanoethyltriethoxysilane, methyltriphenoxysilane, chloromethyltrimethoxysilane, chloromethyltriethoxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltrimethoxyethoxysilane, γ-glycidoxypropyltriphenoxysilane, α-glycidoxybutyltrimethoxysilane, α-glycidoxybutyltriethoxysilane, β-glycidoxybutyltrimethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4-epoxycyclohexyl) ethyltriethoxysilane β-(3,4-epoxycyclohexyl)ethyltripropoxysilane, β-(3,4-epoxycyclohexyl)ethyltributoxysilane, β-(3,4-epoxycyclohexyl)ethyltrimethoxyethoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane and δ-(3,4-epoxycyclohexyl)butyltriethoxysilane; and dialkoxysilanes, diphenoxysilanes, diacyloxysilanes and hydrolysis products thereof, such as dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptopropylmethyldiethoxysilane, γ-aminopropylmethyldiethoxysilane, γ-aminopropylmethyldiethoxysilane, methylvinyldimethoxysilane, methylvinyldiethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, β-glycidoxypropylmethyldiethoxysilane, γ-glycidoxypropylmethyldimethoxysilane, γ-glycidoxypropylmethyldiethoxysilane, γ-glydoxypropylmethyldipropoxysilane, γ-glycidoxypropylmethyldibutoxysilane, 7-glycidoxypropylmethyldimethoxyethoxysilane, γ-glycidoxypropylethyldimethoxysilane, γ-glycidoxypropylmethyldiphenoxysilane, γ-glycidoxypropylmethyldiacetoxysilane, γ-glycidoxypropylethyldiethoxysilane, γ-glycidoxypropylvinyldimethoxysilane, γ-glycidoxypropylvinyldiethoxysilane, γ-glycidoxypropylphenyldimethoxysilane and γ-glycidoxypropylphenyldiethoxysilane.

In the compound represented by the formula (II), which is another preferable silane coupling agent, $R^3$ and $R^5$ can be the same groups as mentioned above with respect to $R^1$ of the formula (I). $R^4$ and $R^6$ can be the same groups as mentioned above with respect to $R^2$ of the formula (I). Further, as the hydrolyzable group Q, there can be mentioned hydrolyzable groups as recited above with respect to X of the formula (I) Each of c and e is 0 or 1 and each of d and f is 0, 1 or 2, with the proviso that each of (c+d) and (e+f) is 0, 1 or 2. When d or f is 2, groups $R^4$ or $R^6$ may be the same or different.

Y is an organic group having 2 to 40 carbon atoms More specifically, Y is a functional group included in the molecule through Si-C bonds Namely, a carbon atom or carbon atoms of the functional group Y are bonded with the adjacent silicon atoms. A hetero atom, for example, an oxygen atom or a nitrogen atom, may be contained in the functional group Y. The functional group Y may be a linear or cyclic organic group, as long as the carbon number is in the range of from 2 to 40, and the oxygen atom and the like may be present, for example, in the form of an epoxy ring or the like. A group Y in which the oxygen atom and the like form an epoxy ring or the like is especially preferable, because the group Y acts as a functional group making a contribution to curing.

As specific examples of Y, there can be mentioned

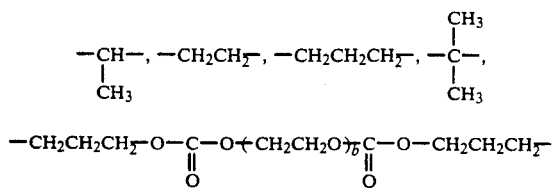

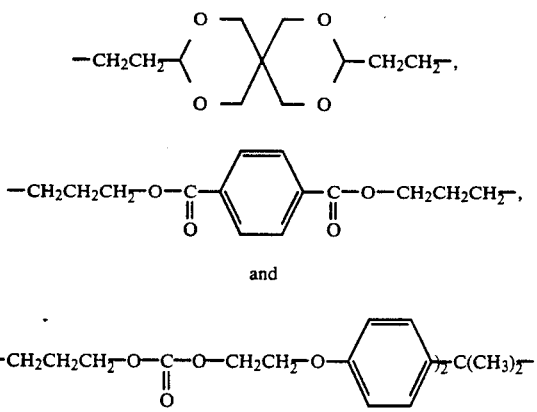

(in which b is an integer of from 1 to 4),

Of the organic silicon compounds represented by the general formulae (I) and (II), organic silicon compounds having an epoxy group or a glycidoxy group are preferably used for improving the low-temperature curability and hardness. In view of the rate of curing and the ease of hydrolysis, an alkoxy group or alkoxyalkoxy group having 1 to 4 carbon atoms is preferable as X or Q.

Of the foregoing organic silicon compounds and hydrolysis products thereof, the hydrolysis products are preferably used for lowering the curing temperature and enhancing the degree of crosslinking.

The hydrolysis is effected by adding pure water or an acidic aqueous solution of hydrochloric acid, acetic acid or sulfuric acid to an organic silicon compound and stirring the mixture. The degree of hydrolysis can be easily controlled by adjusting the amount of pure water or the acidic aqueous solution. To promote the curing, pure water or the acidic aqueous solution is preferably added in an amount of 1 to 3 moles per mole of the group X or Q in the general formula (I) or (II).

Since an alcohol or the like is formed at the hydrolysis, it is possible to carry out the hydrolysis in the absence of a solvent, but to perform the hydrolysis more uniformly, a method can be adopted in which the organic silicon compound is mixed with a solvent such as an alcohol, an ester or an ether and the hydrolysis is then carried out. Furthermore, according to need, after the hydrolysis, an appropriate amount of the alcohol or the like can be removed by heating and/or under a reduced pressure, or an appropriate solvent can be added after the hydrolysis.

Furthermore, if required, to promote the hydrolysis reaction and further advance precondensation reaction or the like, the mixture can be heated at a temperature higher than room temperature. Alternatively, to control precondensation, the hydrolysis can be carried out at a temperature reduced below room temperature.

As another preferable crosslinking agent, a silica sol comprising finely divided silica having an average particle diameter of 5 to 200 mµ is effectively used. A colloidal dispersion of high-molecular-weight silicic anhydride in water and/or a solvent such as an alcohol is preferably used. A colloidal dispersion having an average particle diameter of about 5 to about 200 mµ is preferably used for attaining the object of the present invention, and an average particle diameter of about 7 to about 50 mµ is especially preferable. If the average particle diameter is smaller than 5 mµ, the dispersion stability is low and it is generally difficult to obtain a dispersion having a uniform quality. If the average particle diameter is larger than 200 mµ, the transparency of the formed coating is often low.

The solid amount of the component (B) in the composition is preferably 1.0 to 200 parts by weight per 100 parts by weight of the solid amount of the component (A). If the solid amount of the component (B) is smaller than 1.0 part by weight, the water resistance or hardness is low, and if the solid amount of the component (A) is larger than 200 parts by weight, the anti-fogging property becomes poor. The solid amount of the component (B) is especially preferably 3.0 to 150 parts by weight.

Distilled water, deionized water and filtered water are preferably used as water as the component (C). Water is a component necessary for dissolving the polyvinyl alcohol to prepare a coating. In view of the transparency and coating operation adaptability of the coating composition, preferably water is used in an amount of at least 50 parts by weight, especially at least 150 parts by weight, per 100 parts by weight of the solid amount of the polyvinyl alcohol.

The nitrogen-containing organic solvent as the component (D) must be contained in the coating composition of the present invention for forming the anti-fogging coating. Any nitrogen-containing organic solvents capable of providing a transparent composition can be used. A nitrogen-containing organic solvent having a boiling point of 105 to 300° C. is preferably used. If the boiling point of the nitrogen-containing organic solvent is 105° C. or higher, an especially good smoothness can be given to the formed coating. If the boiling point of the nitrogen-containing organic solvent is 300° C. or lower, curing of the formed coating can be effected very easily. A combined use of the nitrogen-containing organic solvent with an organic solvent having a boiling point of 60° to 300° C. is preferable.

A nitrogen-containing organic solvent capable of dissolving the polyvinyl alcohol therein at a concentration of at least 1% by weight is preferably used as the component (D). It is sufficient if the "dissolving" used herein is the capacity of making the polyvinyl alcohol transparent, and even a thixotropic liquid is included in the solution.

As specific examples of the nitrogen-containing organic solvent, there can be mentioned dimethylformamide, dimethylacetamide, pyridine and dialkylimidazolidinones. Dimethylformamide and dialkylimidazolidinones having an alkyl group having 1 to 4 carbon atoms are preferably used because they are polyvinyl alcohol-dissolving solvents having a boiling point of 105° to 300° C. Of these solvents, dimethylimidazolidinone is easily available and is especially preferably used. Even if the nitrogen-containing organic solvent is left in the formed coating in the reacted or unreacted state, no particular problem or disadvantage arises. For example, where the anti-fogging coating is formed on a glass substrate or on a substrate having a polysiloxane coating, in view of the improvement of the adhesion and water resistance, preferably at least a part of the nitrogen-containing organic solvent is left in the cured coating in the state reacted with other component.

The component (D) is preferably contained in the composition in an amount of 5 to 2,000 parts by weight per 100 parts by weight of the component (C). If the amount of the component (D) is smaller than 5 parts by weight, the effect by the addition of the component (D) is not satisfactory. Namely, the improvement of the anti-fogging property and the adhesion is poor. Furthermore, the pot life of the liquid composition is shortened. If the amount of the component (D) is larger than 2,000 parts by weight, yellowing of the coating becomes severe and the rate of curing tends to drop.

Furthermore, preferably the component (D) is used in an amount of 20 to 500 parts by weight per 100 parts by weight of the solid amount of the component (A). If the amount of the component (D) is smaller than 20 parts by weight, the appearance is sometimes poor, and the solid content changes greatly because of an evaporation of the solvent while the composition is used and the thickness of the coating tends to change. If the amount of the component (D) exceeds 500 parts by weight, the speed of the curing of the coating is reduced and the water resistance and surface hardness become poor.

In addition to the above-mentioned indispensable components, solvents, additives and various modifiers can be incorporated in the coating composition for forming the anti-fogging coating of the present invention, but the indispensable components are preferably contained in the coating composition in a total amount of at least 40% by weight.

As the solvent to be used in addition to the above-mentioned indispensable components, there can be mentioned alcohols, ketones, esters, linear ethers, cyclic ethers, halogenated hydrocarbons, aromatic hydrocarbons such as toluene and xylene, and dimethylsulfoxide.

As the additive, various surface active agents such as a silicon compound, a fluorine type surface active agent and an organic surface active agent can be used for improving the surface smoothness.

As the modifier, organic polymers having a compatibility with the composition of the present invention, such as hydroxyethyl cellulose, polyhydroxyethyl methacrylate or a copolymer thereof, an alcohol-soluble nylon, polyacrylamide, and polyvinylpyrrolidone or a copolymer thereof can be used. Moreover, tetrafunctional silane compounds such as ethyl silicate, n-propyl silicate, i-propyl silicate, n-butyl silicate, i-butyl silicate and t-butyl silicate, and amide resins can be used.

A dye or pigment is preferably added, as long as the transparency is not lowered. Furthermore, the cured coating can be dyed.

Various epoxy resins, urethane resins and acrylic resins are preferably used for improving the weatherability and adhesion. Of these resins, an aliphatic epoxy resin is especially preferably used because the improvement is very high.

If necessary, various catalysts known to be effective for condensation of silanols or reaction of silanols with hydroxyl groups can be used for promoting the curing. An aluminum chelate compound represented by the following general formula:

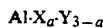

wherein X represents a lower alkoxy group, Y represents a ligand produced from a compound selected from the group consisting of $M^1COCH_2COM^2$ and $M^3COCH_2COOM^4$ (in which $M^1$, $M^2$, $M^3$ and $M^4$ represent a lower alkyl group), and a is 0, 1 or 2, is especially preferably used. Various compounds can be used as this aluminum chelate compound, but in view of the catalytic activity, the solubility in the composition, and the stability, there are especially preferably used aluminum acetylacetonato, aluminum ethylacetoacetate bisacetylacetonato, aluminum bisacetoacetate monoacetylacetonato, aluminum di-n-butoxide monoethylacetoacetate, aluminum di-i-propoxide monomethylacetoacetate, and mixtures thereof.

The composition of the present invention can be prepared, for example, by merely mixing the respective components, or by using preliminarily hydrolyzed components and mixing them with other components. Each of these mixing methods is effective for the production of the anti-fogging coating of the present invention.

The anti-fogging coating can be applied to various substrates, and can be formed on a substrate according to a conventional coating method. Any substrates not lowering the characteristics of the anti-fogging coating of the present invention can be used without limitation. As the substrate on which the characteristics of the anti-fogging coating of the present invention are prominently manifested, there can be mentioned plastic materials, inorganic glass materials, transparent ceramic materials, metal materials, and mirror surface materials. Especially good application effects are obtained on an inorganic glass surface because a good adhesion is produced. From the viewpoint of the practical value, the composition of the present invention is preferably applied to plastic and inorganic glass lenses, windows and mirrors of bathrooms, and windows of electric cars and automobiles.

Various known coating methods such as brush coating, dip coating, spin coating, flow coating, spray coating, roll coating and curtain flow coating can be adopted for coating the composition of the present invention on an article to be coated.

In the present invention, the heat curing of the coating is preferably carried out at 50° to 250° C. If the heat curing temperature is lower than 50° C., the curing is unsatisfactory or the durability is often poor. If the heat curing temperature is higher than 250° C., the coating is easily yellowed. To satisfy such functions as the anti-fogging property, durability, and surface hardness, simultaneously, the heat curing is preferably carried out at a temperature of from 90 to 200° C. Also, preferably the curing is carried out in a plurality of stages at different temperatures, or is carried out while continuously changing the temperature.

The anti-fogging coating of the present invention is obtained from the above-mentioned composition, and the thickness of the anti-fogging coating is preferably at least 1 μm. Namely, if the thickness is smaller than 1 μm, the anti-fogging effect is low and only a coating having a very low practical utility is obtained. The upper limit of the thickness of the coating is not particularly critical and the coating in the form of a film or sheet can be used. Nevertheless, in view of the mechanical properties, preferably the thickness is adjusted to less than 500 μm and the coating is used in the state formed on a substrate. When the coating is formed by one coating operation, from the viewpoint of the workability, the thickness is preferably smaller than 200 μm.

The anti-fogging coating per se, prepared in the above-mentioned manner according to the present invention, has a practical utility, but to further enhance the effect, preferably the coating and curing of the composition are carried out in an elevated humidity atmosphere, or the cured coating is subjected to a wetting treatment. The wet heat treatment referred to herein means standing in a high-temperature and high-humidity atmosphere or immersion in warm or hot water. To further enhance the effect, a surface active agent, an acid or a base is preferably added at the immersion treatment.

The following four methods can be mentioned as the preferable treatment.

According to the first method, the heat-cured coating is immersed in an aqueous alkali solution containing 0.01 to 40% by weight, based on the solution, of an alkali for 0.1 minute to 5 hours. If the concentration is lower than 0.01% by weight or the immersion time is shorter than 0.1 minute, it is difficult to obtain a satisfactory anti-fogging effect. If the concentration is higher than 40% by weight, the adhesion between the coating and substrate is reduced, and if the treatment time is longer than 5 hours, the productivity is lowered. It is considered that various aqueous solutions can be used as the alkali solution. For example, aqueous solutions of LiOH, KOH, NaOH and ammonia can be mentioned, and aqueous solutions of NaOH and ammonia are preferably used. The treatment is preferably carried out at a pH value of at least 8 at an alkali concentration of 0.2 to 20% by weight for 0.2 to 90 minutes. To shorten the treatment time and increase the treatment effect, the aqueous solution is preferably used at a temperature of at least 20° C. Optimum treatment conditions are experimentally determined within the above-mentioned ranges according to the desired anti-fogging performance and the composition of the coating.

According to the second method, the heat-cured coating is immersed in an aqueous acid solution containing 0.01 to 40% by weight, based on the solution, of an acid for 0.1 minute to 5 hours. If the concentration is lower than 0.01% by weight or the treatment time is shorter than 0.1 minute, a sufficient improvement of the anti-fogging effect cannot be obtained. If the concentration is higher than 40% by weight or the treatment time is longer than 5 hours, the performances of the coating, especially the adhesion, are lowered. Various acidic solutions can be used, and aqueous solutions having a pH value not higher than 5 are preferably used. An aqueous solution of HCl is especially preferably used in view of the handling ease. In general, preferably, the treatment is carried out at an acid concentration of 0.02 to 20% by weight for 0.5 to 90 minutes. To shorten the treatment time and increase the treatment effect, the aqueous solution is preferably used at a temperature of at least 20° C. The optimum treatment conditions are experimentally determined within the above-mentioned ranges according to the required anti-fogging effect and the composition of the coating.

According to the third method, the heat-cured coating is immersed in an aqueous solution containing 0.1 to 40% by weight, based on the solution, of a surface active agent for 0.5 minute to 5 hours. If the concentration of the surface active agent is lower than 0.1% by weight, the improvement of the anti-fogging property is unsatisfactory, and if the concentration of the surface active agent is higher than 40% by weight, a large amount of the surface active agent is left on the treated surface, and it is difficult to remove the surface active agent by washing. If the treatment time is shorter than 0.5 minute, the anti-fogging effect is low and if the treatment time is longer than 5 hours, the productivity is lowered. It is considered that various activators can be used as the surface active agent, and nonionic, cationic, anionic and amphoteric surface active agents can be mentioned and nonionic surface active agents are especially effective for improving the anti-fogging property at low temperatures. As specific examples of the surface active agent, there can be mentioned silicone type compounds, fluorine type surface active agents and organic surface active agents. As especially effective examples, there can be mentioned sodium dodecyl benzenesulfonate, polyoxyethylene lauryl ether and polyoxyethylene stearyl ether. The immersion treatment is preferably carried out at a surface active agent concentration of 0.2 to 20% by weight for 1.0 to 90 minutes. To shorten the treatment time and enhance the treatment effect, the aqueous solution is preferably used at a temperature of at least 50° C. To enhance the treatment effect, an acid or a base is preferably added. Optimum conditions are experimentally determined within the above-mentioned ranges according to the required anti-fogging effect and the composition of the coating.

According to the fourth method, the heat-cured coating is treated under conditions of a temperature of at least 50° C. and a relative humidity of at least 70% for 0.5 minute to 5 hours. This fourth method includes a wet heat treatment wherein the heat-cured coating is immersed in water maintained at a temperature of at least 50° C. for 0.5 minute to 5 hours. If the temperature is lower than 50° C., the relative humidity is lower than 70% or the treatment time is shorter than 0.5 minute, a sufficient improvement of the anti-fogging effect is not attained. If the treatment time is longer than 5 hours, the productivity is lowered. The relative humidity is preferably 75 to 100%, and to shorten the treatment time, the temperature is especially preferably at least 75° C. Optimum conditions are experimentally determined within the above-mentioned ranges according to the required anti-fogging performance and the composition of the coating.

The present invention will now be described in detail with the following examples.

EXAMPLE 1

(1) Preparation of hydrolysis product of γ-glycidoxypropyltrimethoxysilane

A reaction vessel equipped with a rotor was charged with 236 g of γ-glycidoxypropyltrimethoxysilane, and 54 g of a 0.01N aqueous solution of hydrochloric acid was gradually added dropwise into the reaction vessel with stirring by a magnetic stirrer while maintaining the liquid temperature at 10° C. After the dropwise addition, the cooling was stopped to obtain a hydrolysis product of γ-glycidoxypropyltrimethoxysilane.

(2) preparation of coating solution

A beaker was charged with 532 g of an aqueous solution containing 27.1% by weight of a polyvinyl alcohol (AL-06 supplied by Nippon Synthetic Chemical Industry; having an average polymerization degree of about 600 and a saponification degree of 91.0 to 94.0 mole %), and 62.4 g of the above-mentioned hydrolysis product of γ-glycidoxypropyltrimethoxysilane the solid content was 57.6% by weight), 226.63 g of dimethylimidazolidinone (157.2 parts by weight per 100 parts by weight of the polyvinyl alcohol), 3.6 g of aluminum acetylacetone as the catalyst and 0.6 g of a fluorine type surface active agent are incorporated and dissolved in the aqueous solution to prepare a coating solution.

(3) Formation of anti-fogging coating

The coating solution prepared in (2) above was coated on a float glass and after 20 minutes, the coating was dried at 140° C. for 2 hours by a hot air drier. Then, the coating was immersed in hot water at 90° C. for 1 hour to effect a wet treatment, and thereafter, the coating was dried to obtain a glass substrate having an anti-fogging coating.

(4) Evaluation

The anti-fogging coating obtained in (3) above had a thickness of 15 μm and an uneven coating was not observed. The transparency was good and the total luminous transmittance was 93%.

The coated glass substrate was immersed in boiling water, and 100 square cuts having a side of 1 mm and reaching the substrate were formed in the coating by a steel knife. An adhesive cellophane tape (Celo-Tape supplied by Nichiban) was strongly press-bonded to the coating and was rapidly peeled in a direction of 90°. Peeling of the coating did not occur, and it was found that the coating had a good adhesion.

To evaluate the anti-fogging property, a breath was blown onto the coating, but the coating did not become dim. The glass substrate having the anti-fogging coating of the present invention was immersed in city water for 1 week, and the coating was similarly tested. The coating did not become dim and it was confirmed that the coating had a durable anti-fogging property.

To determine the limit of the anti-fogging property, the outer atmosphere was maintained at a temperature of 23° C. and a relative humidity of 50% and the abovementioned glass substrate was exposed to a temperature of 40° C. and a relative humidity of 100%, and the time required for dewing in this state was measured. In the anti-fogging coating obtained in this example, fogging by dewing did not occur even after the lapse of 3 minutes.

For comparison, an anti-fogging coating was prepared according to Example 1 of Japanese Examined Patent Publication No. 62-28986 was similarly tested, fogging occurred after about 40 seconds.

Furthermore, the pencil hardness was of the coating prepared by the process of the present invention measured according to JIS K5400, and it was found that the pencil hardness was 4H, and thus that the surface hardness was excellent.

EXAMPLE 2

A substrate having an anti-fogging coating was prepared in the same manner as described in Example 1 except that the amount of dimethylimidazolidinone was changed to 66.63 g (46.2 parts by weight per 100 parts by weight of the polyvinyl alcohol) from 226.63 g, and 107.6 g of 1,4-dioxane and 52.4 g of methanol were further added.

The evaluation was carried out in the same manner as described in Example 1. The results are shown in Table 1.

EXAMPLE 3

A substrate having an anti-fogging coating was prepared in the same manner as described in Example 1 except that N,N-dimethylformamide was used instead of dimethylimidazolidinone.

The evaluation was carried out in the same manner as described in Example 1. The results are shown in Table 1.

EXAMPLE 4

A substrate having an anti-fogging coating was prepared in the same manner as described in Example 1 except that N,N-dimethylacetamide was used instead of dimethylimidazolidinone.

The evaluation was carried out in the same manner as described in Example 1. The results are shown in Table 1.

COMPARATIVE EXAMPLE 1

A substrate having an anti-fogging coating was prepared in the same manner as described in Example 1 except that 1,4-dioxane was used instead of dimethylimidazolidinone.

The evaluation was carried out in the same manner as described in Example 1. The results are shown in Table 1.

COMPARATIVE EXAMPLE 2

A substrate having an anti-fogging coating was prepared in the same manner as described in Example 1 except that dimethylsulfoxide was used instead of dimethylimidazolidinone.

The evaluation was carried out in the same manner as described in Example 1. The results are shown in Table 1.

EXAMPLE 5

The coating and evaluation were carried out in the same manner as described in Example 1 except that at the coating solution-preparing step (2), the coating solution was allowed to stand at room temperature for 1 week. As the result, it was found that all of the appearance, surface hardness and anti-fogging performance were as good as those observed in Example 1, and it was confirmed that the coating solution had a good stability.

EXAMPLE 6

A substrate having an anti-fogging coating was prepared in the same manner as described in Example 1 except that the wet treatment conditions were changed as follows:

Wet treatment solution: an aqueous solution containing 0.1% by weight of sodium hydroxide Treatment temperature: 40° C.

Immersion time: 2 minutes

As the result, it was found that all of the appearance, surface roughness and anti-fogging performance were as good as those observed in Example 1.

COMPARATIVE EXAMPLE 3

A coating solution was prepared in the same manner as described in Example 1 except that methanol was used instead of dimethylimidazolidinone. In the same manner as described in Example 5, the obtained coating solution was allowed to stand at room temperature for 1 week and then coated. After 3 days, the coating solution became heterogeneous, and the adhesion of the coating was poor.

TABLE 1

|  | Appearance | Adhesion | Anti-fogging property (breath method) | Anti-fogging property (limit method) | Pencil hardness |
| --- | --- | --- | --- | --- | --- |
| Example 2 | Good | Good | Good | >3 Minutes | 4H |
| Example 3 | Good | Good | Good | >3 Minutes | 4H |
| Example 4 | Good | Good | Good | >3 Minutes | 4H |
| Comparative Example 1 | Whitened | Bad | Good | >3 Minutes | 4H |
| Comparative Example 2 | Somewhat whitened | Bad | Good | >3 Minutes | 3H |

The anti-fogging coating prepared by the process of the present invention has the following characteristic properties.

(1) The coating has a good anti-fogging property and the anti-fogging effect can be maintained.

(2) The durability characteristics such as the water resistance are good.

(3) The adhesion to a substrate is good.

(4) The surface hardness is high.

(5) The coating composition shows a good storage stability for a long time.

(6) Since the change of the concentration of the polyvinyl alcohol is small while the coating composition is used, an anti-fogging coating having a good quality can be stably obtained.

(7) An especially good adhesiveness is obtained to an inorganic glass surface.

(8) The setting flowability after the coating operation is good, and a coating having a good appearance and no coating unevenness is obtained.

We claim:

1. A process for the preparation of an anti-fogging coating, which comprises coating on a substrate a composition comprising, as main components, (A) a polyvinyl alcohol, having an average polymerization degree of 250-3,000 and having a saponification degree of at least 70 mole %, (B) a crosslinking agent, (C) water and (D) 5-2000 parts by weight per 100 parts by weight of said water of a nitrogen-containing organic solvent capable of forming a transparent composition on said substrate, and heat-curing the coated composition.

2. A process for the preparation of anti-fogging coating according to claim 1, which further comprises immersing the heat-cured coating in an aqueous solution containing 0.1 to 40% by weight, based on the aqueous solution, of a surface active agent for a period of 0.5 minute to 5 hours.

3. A process for the preparation of an anti-fogging coating according to claim 1, wherein the crosslinking agent is at least one member selected from the group consisting of finely divided silica having an average particle diameter of from 5 mµ to 200 mµ, organic silicon compounds represented by the following general formulae (I) and (II), and hydrolysis products thereof:

  (I)

and

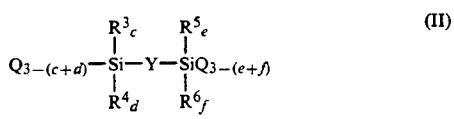  (II)

wherein $R^1$, $R^3$ and $R^5$ represent an organic group having 4 to 14 carbon atoms, which contains an epoxy group, $R^2$, $R^4$ and $R^6$ represent a hydrocarbon group having 1 to 14 carbon atoms, or a hydrocarbon group having 1 to 14 carbon atoms which has a substituent selected from the group consisting of a halogeno group, a mercapto group, a cyano group, a methacryloxy group, an acryloxy group and an amino group, X and Q represent a hydrolyzable group, each of a, c and e is 0 or 1 and each of b, d and f is 0, 1 or 2, with the proviso that each of (a +b), (c+d) and (e+f) is 0, 1 or 2, and Y represents an organic group having 2 to 40 carbon atoms.

4. A process for the preparation of an anti-fogging coating according to claim 1, wherein the solid amount of the crosslinking agent as the component (B) is 1.0 to 200 parts by weight per 100 parts by weight of the solid amount of the polyvinyl alcohol.

5. A process for the preparation of an anti-fogging coating according to claim 1, wherein the nitrogen-containing organic solvent has a boiling point of from 105° to 300° C.

6. A process for the preparation of an anti-fogging coating according to claim 1, wherein the nitrogen-containing organic solvent is a solvent in which the polyvinyl alcohol is soluble.

7. A process for that preparation of an anti-fogging coating according to claim 1, wherein the nitrogen-containing organic solvent is at least one member selected from the group consisting of dimethylformamide, dimethylacetamide, pyridine and dialkylimidazolidinones.

8. A process for the preparation of an anti-fogging coating according to claim 1, wherein the nitrogen-containing organic solvent is dimethylimidazolidinone.

9. A process for the preparation of an anti-fogging coating according to claim 1, wherein the nitrogen-containing organic solvent is used in an amount of 20 to 500 parts by weight per 100 parts by weight of the solid amount of the polyvinyl alcohol.

10. A process for the preparation of anti-fogging coating according to claim 1, which further comprises immersing the heat-cured coating in an aqueous solution containing 0.01 to 40% by weight, based on the aqueous solution, of an alkali for a period of 0.1 minute to 5 hours.

11. A process for the preparation of anti-fogging coating according to claim 1, which further comprises immersing the heat-cured coating in an aqueous solution containing 0.01 to 40% by weight, based on the aqueous solution, of an acid for a period of 0.1 minute to 5 hours.

12. A process for the preparation of anti-fogging coating according to claim 1, which further comprises treating the heat-cured coating under conditions of a temperature of at least 50° C. and a relative humidity of at least 70% for a period of 0.5 minute to 5 hours.

* * * * *

UNITED STATES PATENT AND TRADEMARK OFFICE
CERTIFICATE OF CORRECTION

PATENT NO. : 5,075,133
DATED : December 24, 1991
INVENTOR(S) : Hiroshi Hosono et al It is certified that error appears in the above-identified patent and that said Letters Patent is hereby corrected as shown below:

Column 3, line 29, after "mentioned" insert --tetraalkoxysilane compounds and hydrolysis products thereof, such as ethyl silicate, n-propyl silicate, i-propyl silicate, n-butyl silicate, i-butyl silicate and t-butyl silicate,--.

Column 3, line 45, please change "amime" to --amino--.

Column 4, line 32, please change "7" to --$\gamma$--.

Column 7, line 42, please change "silicon" to --silicone--.

Signed and Sealed this

Fourth Day of January, 1994

Attest:

BRUCE LEHMAN

*Attesting Officer*   Commissioner of Patents and Trademarks